June 27, 1939.　　F. JEREMIASSEN　　2,164,112
CRYSTALLIZATION PROCESS
Filed Nov. 11, 1937
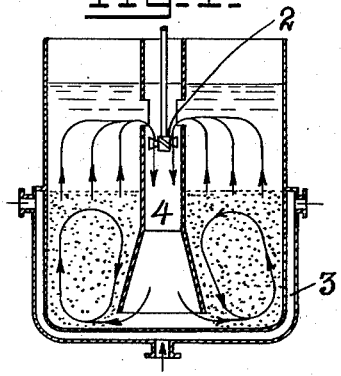
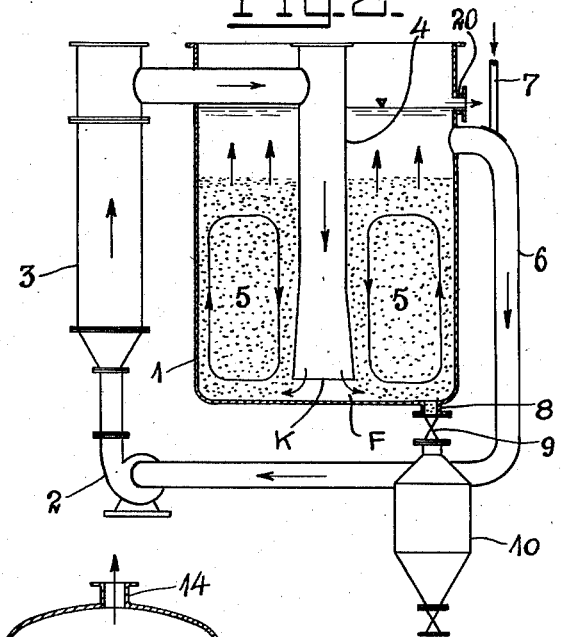
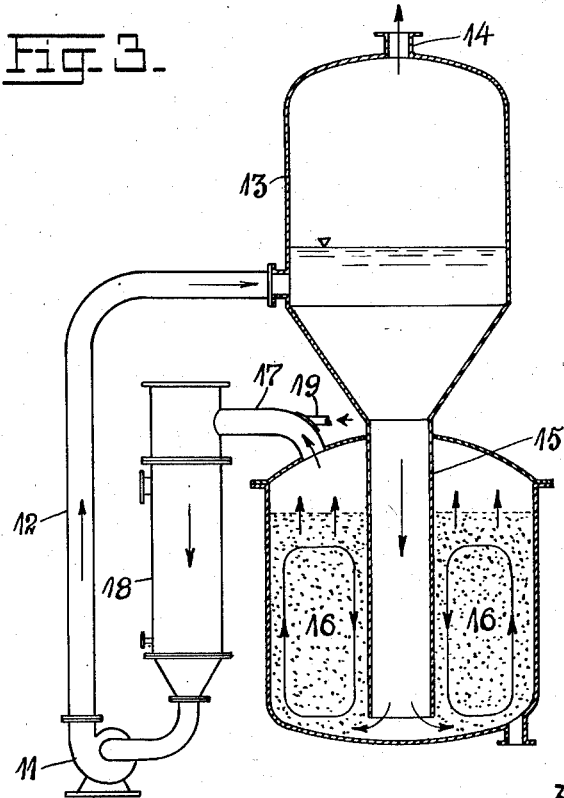
F. Jeremiassen
INVENTOR
By Glascock Downing & Seebold
Attys.

Patented June 27, 1939

2,164,112

UNITED STATES PATENT OFFICE 2,164,112

CRYSTALLIZATION PROCESS

Finn Jeremiassen, Oslo, Norway, assignor to Aktieselskapet Krystal, Oslo, Norway, a Norwegian concern Application November 11, 1937, Serial No. 174,120
In Norway April 3, 1933

2 Claims. (Cl. 23—1)

This is a continuation in part of my prior pending application, Serial No. 718,019 filed on the 29th of March 1934 for a Method of maintaining a high and dense suspension.

The invention relates to crystallization processes of the type in which a suspension of growing crystals is maintained in a circulating flow of supersaturated solution and has for its object a method by means of which it is rendered possible to maintain for a long time a high and dense suspension of crystals in an ascending flow of solution under such conditions as to enable the solution to most efficiently wash on all sides of the individual crystals thereby releasing its supersaturation thereon.

According to the invention this effect is attained by causing a body of suspended crystals to rotate in a confined space within an ascending flow of supersaturated fluid so as to cause the individual crystals of the body of the suspension to repeatedly traverse the ascending flow of liquid. The said body of suspended crystals according to the invention is maintained in rotation in such a manner as to cause the upper and lower parts of the said body to traverse the ascending solution in opposite directions.

The rotating movement of the body of suspended crystals is brought about by a laterally directed stream of solution injected into the body of suspended crystals in a substantially horizontal direction at a point immediately above the substantially horizontal bottom boundary thereof so as to sweep along the said bottom boundary from one side thereof to the other.

In order to bring about the effect aimed at the volume and velocity of the injected stream of solution must be so controlled as to be able to lift the entire body of crystals without causing any substantial part thereof to be carried along with the solution out of the suspension chamber. If the stream of injected solution is too weak the body of crystals will not be lifted and caused to rotate in the ascending solution in the manner above explained. In this case the ascending solution will only filter or seep through a substantially stationary assembly of granules and this will gradually result in the growing together of the individual crystals. On the other hand if the stream of injected solution is too strong the crystals will be carried along with the solution and will not form the rotating body of suspended crystals aimed at.

Some embodiments of apparatus suitable for carrying the invention into effect are diagrammatically illustrated in the accompanying drawing in which Fig. 1 is a diagrammatical sectional view of the suspension chamber in an apparatus adapted for carrying the invention into effect.

Fig. 2 is a sectional view of a modified arrangement in which the means for maintaining the circulating solution in a supersaturated condition are arranged outside of the suspension chamber.

Fig. 3 is a sectional view of a further modification of the apparatus.

In the example illustrated in Fig. 1 1 is the suspension vessel, 2 is a propeller for maintaining the supersaturated solution in circulation from the top of the vessel into the bottom part thereof, and back through the rotating body of suspended crystals. 3 is a jacket for introducing a cooling (or heating) fluid employed to bring about supersaturation of the circulating solution. 4 is a centrally arranged tube through which the solution withdrawn from the surface layers of the solution in the container is conducted back to the bottom part of the container to be injected into the body of suspension at a point immediately above the bottom boundary thereof.

In the example illustrated in Fig. 2 a pump 2 for withdrawing liquid from the suspension container 1 and reintroducing it at the bottom thereof is mounted in a channel outside of the container 1.

In the operation of this apparatus approximately saturated solution is drawn by pump 2 through pipe 6 and is forced through the cooler 3. Through the cooling in the latter the solution becomes supersaturated, but within its metastable limit so that salt is not precipitated. The solution passes on, through the central pipe 4, up through the assembly of crystals 5 and through pipe 6 back to pump 2. Solution of a higher temperature and with a larger percentage of salt than is contained in the solution in container 1, is continuously supplied through pipe 7. The temperature and the strength of this feed solution are regulated so as will prevent any supersaturating beyond the metastable limit taking place on the feed being mixed with the mother liquor. And this has proven to be feasible. The feed solution, it is true, is cooled through the mixing, whereby its dissolving power is reduced, but in return heats the colder solution with which it becomes mixed so that the dissolving capacity of the latter is increased accordingly. Excess solution in container 1 overflows at 20.

As mentioned above, the supersaturation called forth through the cooling in 3 does not exceed the metastable limit. Only in the assembly of crystals 5 the supersaturation is permitted to be released, which results in the crystals expanding in size.

When grown to the size desired, the crystals may be removed in known manner, for instance through a discharge pipe 8 and a valve 9, down into a vessel 10, from which they may be discharged after closing of valve 9.

In performing tests applicant arrived at the surprising result, that by using an arrangement as shown it is possible, provided the quantities per second of the circulating solution are kept within certain limits, to raise even a high assembly of crystals of very different size and to keep it floating for weeks without the large-size crystals coming to rest on the bottom and caking in the supersaturated solution, yet avoiding that any substantial amount of the smaller-size crystals are carried along with the flow of liquid into pipe 6.

That this industrially very important state of suspension can altogether be attained by such a simple means was not hitherto known. The reason why it is established under the conditions described below are as follows:

Before the circulation of the solution is started the crystals lie densely packed around the annular opening F below the pipe edge K. The free cross sectional area between the granules, through which the solution must leave the pipe, is of the order one tenth of the total cross section F. Accordingly, a comparatively great superpressure is required in pipe 4 to force such large quantities of solution into the assembly of crystals as are employed by the present invention. The comparatively great horizontal pressure which the solution therefore exerts on the vertical annular cross section F below the pipe edge K forces the solution radially outward at the bottom of the container. In order to compel the solution to pass out evenly distributed over the entire cross section of F, this opening is only to be a small fraction of the horizontal sectional area of the suspension chamber.

As this superpressure, however, as soon as it is outside the annular opening F, will have an increasing effect in upward direction, it will at the same time lift the assembly of crystals somewhat. The result of this is again that the friction against the bottom gradually decreases, so that the horizontal stream of crystals gets stronger and stronger carrying an increasing amount of solution because the crystals retard the flow of solution in a constantly reduced degree, on account of their own motion; this, in turn, involves that the upward flow of solution from said horizontally moving mixture of solution and crystals constantly extends outward. Experience shows that after a short time the solution ascends practically evenly distributed over the entire cross section of the container, while the assembly of crystals assumes the circulating movement as indicated on the drawing by arrows, i. e. horizontally outward at the bottom, then upwards along the container wall, turning horizontally inward at top and descending along the pipe 4.

And this circulating movement automatically maintains such pressure differences as will keep it going. The high assembly of crystals close to pipe 4 moves downward with comparatively great velocity, as the pipe is smooth and has no retarding projection. Immediately at the bottom the rapid vertical movement is suddenly stopped and deflected so as to take a horizontal course along the bottom. This means that the crystals are ever again caused to pack comparatively densely immediately before the annular opening F, with the result that also the superpressure in pipe 4 is maintained, which, as is mentioned above, is a prime condition to the circulating movement. At all points where the solution might have a tendency to ascend in "wells", whereby the solution would be unevenly distributed over the cross section of the container, such "wells" would immediately be clogged by the large amounts of crystals which would be forced into them sideways by the circulating movement.

As a matter of course the effect aimed at will be attained only when the quantity of liquid per second injected at the bottom of the suspension chamber is maintained between certain limits. If the quantity is too large the whole assembly of crystals will be carried along with the liquid and will not be caused to traverse the ascending flow of liquid at a point below the surface of liquid in container 1. Practically all of the granules will be carried along all the way of the circulating solution, in other words also into the pump and the pipe 4. On the other hand if the quantity of liquid in the unit of time is not large enough the assembly of crystals will not be lifted and caused to circulate. The introduced liquid in this case will only gradually filter or seep upward through a substantially stationary column of crystals, the result of this being that the individual crystals gradually grow together to coherent cakes.

Instead of using cooling, the supersaturation of the circulating solution may of course be effected in any other way desirable, for instance by providing a heater in place of cooler 3 and gradually evaporating the solution.

Fig. 3 illustrates diagrammatically an apparatus adapted for carrying into effect this particular application of the process. A pump 11 forces heated solution, which is approximately saturated, through the pipeline 12 to an evaporating chamber 13. In the latter, part of the solution vaporizes, the vapour emitting through pipe 14. The solution, which is now supersaturated but within the metastable limit, passes through the pipe 15, the assembly of crystals 16, pipe 17 and the heater 18 and then back to the pump 11. Fresh solution, by preference almost saturated with the substance to be crystallized, is continuously added through pipe 19. The removal of the finished crystals may be effected as indicated in Fig. 1.

I claim:

1. Method of producing crystals consisting in rotating a body of crystals suspended in a rising current of a super-saturated solution in an annular space, the crystals ascending with, traversing, descending against and traversing the current of the solution in the annular space, withdrawing the solution above the annular space and reintroducing same centrally of and at the bottom of the annular space in a substantially horizontal direction whereby the rotation of the crystals is effected, the cross-sectional area of the solution which is reintroduced into the annular space being only a small fraction of the horizontal cross-sectional area of the annular space.

2. A method of producing crystals as claimed in claim 1, wherein the quantity and flow of the solution being reintroduced into the annular space is so regulated as to maintain the crystals in suspension but prevent the crystals from being carried with the solution when it is withdrawn above the annular space.

FINN JEREMIASSEN.